US008268151B2

(12) United States Patent
Medoro et al.

(10) Patent No.: US 8,268,151 B2

(45) Date of Patent: Sep. 18, 2012

(54) METHOD AND DEVICE FOR THE MANIPULATION OF PARTICLES BY OVERLAPPING FIELDS OF FORCE

(75) Inventors: Giovanni Medoro, Casalecchio di Reno (IT); Nicolo Manaresi, Bologna (IT)

(73) Assignee: Silicon Biosystems S.p.A., Bologna (IT)

( * ) Notice: Subject to any disclaimer, the term of this patent is extended or adjusted under 35 U.S.C. 154(b) by 442 days.

(21) Appl. No.: 12/376,761

(22) PCT Filed: Aug. 7, 2007

(86) PCT No.: PCT/IB2007/002255

§ 371 (c)(1), (2), (4) Date: Jun. 5, 2009

(87) PCT Pub. No.: WO2008/017922

PCT Pub. Date: Feb. 14, 2008

(65) Prior Publication Data

US 2010/0200404 A1 Aug. 12, 2010

(30) Foreign Application Priority Data

Aug. 7, 2006 (IT) .............................. TO2006A0586

(51) Int. Cl.
*G01N 27/447* (2006.01)

(52) U.S. Cl. ...................................................... 204/547

(58) Field of Classification Search .................. 204/547, 204/643
See application file for complete search history.

(56) References Cited

U.S. PATENT DOCUMENTS

| | | | | |
|---|---|---|---|---|
| 6,113,768 | A | 9/2000 | Fuhr et al. | |
| 6,185,084 | B1 | 2/2001 | Tai et al. | |
| 2002/0036141 | A1 | 3/2002 | Gascoyne et al. | |
| 2003/0047456 | A1 * | 3/2003 | Medoro | 204/547 |

FOREIGN PATENT DOCUMENTS

| | | |
|---|---|---|
| EP | 1 185 373 B1 | 8/2004 |
| GB | 1 362 232 | 7/1974 |
| WO | WO 00/47322 | 8/2000 |
| WO | WO 00/69565 | 11/2000 |
| WO | WO 2007/010367 | 1/2007 |

OTHER PUBLICATIONS

International Search Report dated Feb. 7, 2008, issued in PCT/IB2007/002255.

Written Opinion of the International Searching Authority issued in PCT/IB2007/002255.

* cited by examiner

*Primary Examiner* — J. Christopher Ball

(74) *Attorney, Agent, or Firm* — Venable LLP; Robert Kinberg; Christopher Ma

(57) ABSTRACT

Methods and relative devices are illustrated for generating time-variable electric fields suitable for determining the creation of closed dielectrophoretic cages able to trap inside even single particles without the cages being necessarily positioned at relative minimum points of the electric field.

12 Claims, 8 Drawing Sheets

METHOD AND DEVICE FOR THE MANIPULATION OF PARTICLES BY OVERLAPPING FIELDS OF FORCE

TECHNICAL FIELD

The present invention concerns methods and miniaturised equipment for the manipulation of particles. The invention is applied mainly in the implementation of biological protocols on reduced-volume cell samples; or which require accurate control of individual cells or particles.

STATE OF THE ART

The European patent n. EP1185373 (and the recent Italian patent application BO2005A000481, Medoro et al.), describes a device and some methods for manipulating particles by means of arrays of electrodes.

The method described teaches how to control the position of each particle independently of all the others in a two-dimensional space. The force used to trap the particles in suspension is negative dielectrophoresis. In particular the cited patent teaches how to trap particles in a stable manner via the use of negative closed dielectrophoretic cages, the centre of which is identified, according to the classic representation of the theory of dielectrophoresis, with the position of a local minimum of the electric field. The manipulation operations are individually controlled by the programming of memory and circuit elements associated with each element of an array of electrodes integrated in the same substrate.

The same patent also describes an apparatus for the manipulation of particles via the use of closed dielectrophoretic potential cages.

This device consists of two basic modules; the first consists of a regular distribution of electrodes (M1 in FIG. 1) arranged on an insulating support (O1 in FIG. 1). The electrodes can be made of any conductive material with a preference for metals compatible with the technology of electronic integration, while the insulating means can be silicon oxide or any other insulating material.

The electrodes of the array can be of various shapes; FIG. 1 shows electrodes with square form. Each element of the array M1 consists of an electrode (LIJ in FIG. 1) to generate the dielectrophoretic cage (S1 in FIG. 1) for manipulation of the biological sample (BIO in FIG. 1), and the whole process takes place in a liquid or semi-liquid environment (L in FIG. 1).

In the region below the electrodes (C in FIG. 1) there can be located integrated circuits for sensing, i.e. sensors, which can be of various types, able to detect the presence of the particle inside the potential cages generated by the electrodes.

In the preferred embodiment the second main module consists substantially of one single large electrode (M2 in FIG. 1) which covers the entire device. Lastly, there may be an upper supporting structure (O2 in FIG. 1).

The simplest form for this electrode is that of a flat uniform surface; other more or less complex forms are possible (for example a more or less fine-mesh grille to allow the light to pass through).

To implement this manipulation technique it is necessary to provide and stimulate, by means of appropriate electrical voltages, an array of electrodes, the geometric form and spatial distribution of which are fundamental for the minimisation of two undesired effects:

1. Parasite cages: i.e. undesired dielectrophoresis cages which can act as traps for the particles, removing some elements of the sample from the control of the system. These traps occur typically between electrodes powered with the same phase. To reduce the effects of these parasite cages it is necessary to reduce the basin of attraction so that it is smaller than the particles and therefore not large enough to accommodate a particle. This is done, according to the known art, by reducing the gap between the electrodes, which results in the increase of a second negative effect, i.e. power consumption.
2. Dissipation of power: by reducing the distance between the electrodes, the impedance between the electrodes is reduced, thus increasing the current and therefore the dissipation of power. This dissipation of power causes an increase in the temperature which is lethal for the cells and the system itself. In order to control the temperature, according to the known art, it is possible to reduce the conductivity of the liquid (by creating a non-physiological environment for the cells and therefore inhibiting some biological processes) either by extracting the heat from the outside by means of complex and cumbersome cooling systems (such as heat pumps) or by reducing the voltages and therefore drastically slowing down the process of manipulation of the cells and increasing the duration of the protocols.

The control and minimisation of these effects is essential for the practical realisation of apparatuses for individual manipulation of a plurality of particles, in particular for point-of-care applications.

These effects are, however, closely interlinked, and therefore reduction in the entity of one involves an increase in the other.

It is an object of the present invention to provide a method and apparatus or device for the manipulation of particles based on dielectrophoresis, overcoming the limits that characterise the techniques of the known art.

SUMMARY OF THE INVENTION

The present invention concerns methods and devices for the realisation of dielectrophoretic fields of force in order to obtain a substantial reduction in the effects of parasite cages and in power dissipation, by creating closed dielectrophoretic cages for the manipulation of particles without the cages necessarily having to be located at local minima of the electric field.

A method according to the invention can be used, as a non-limiting example for the purposes of the present invention, for the realisation of closed dielectrophoretic cages by overlapping the effects of N different configurations of force, each of which does not necessarily have a corresponding electric field minimum at the centre of the dielectrophoretic cage.

It is also an object of present invention to provide a method for the reduction of the effects of parasite cages and dissipated power obtained via the use of auxiliary electrodes, in addition to devices for implementing the above-mentioned methods in a particularly advantageous manner.

In particular, the manipulation of particles by means of closed dielectrophoretic cages is performed according to a method comprising the step of generating at least one closed dielectrophoretic cage so as to trap at least one particle inside it, and the step of moving the closed cage along a controlled path, in which said at least one closed dielectrophoretic cage is generated and moved by applying around the particle an electric field variable in time by means of an array of first electrodes which can be individually addressed and activated and by means of at least one second electrode positioned facing towards and spaced apart from the first electrodes so as to delimit between itself and said array of first electrodes a chamber suitable for containing said particles in suspension in a fluid medium; wherein the step of generating at least one closed dielectrophoretic cage is performed by applying to at least one said first electrode at which said at least one cage is to be generated a voltage configuration in phase with a voltage configuration applied to said at least one second electrode, and to a group of first electrodes of the array immediately surrounding the cage to be generated a succession over time of different voltage configurations such that at least one of said first electrodes of said group is always in counter-phase with the voltage configuration applied to the second electrode.

According to a further aspect of the invention, the manipulation of particles by means of closed dielectrophoretic cages is performed by applying to at least one first group of first electrodes of the array of electrodes corresponding to each of which said at least one cage is to be generated, a voltage configuration in phase with a voltage configuration applied to the second electrode, and by applying to at least one second group of first electrodes immediately surrounding the cage to be generated a voltage configuration in counter-phase with the voltage configuration applied to the second electrode; and, simultaneously, by generating a localised increase in the intensity of the electric field in regions of said chamber containing, positioned immediately adjacent to one other, first electrodes to which voltage configurations having identical phase are applied.

Here and below, the terms "particles" or "particle" indicate micrometric or nanometric entities, natural or artificial, such as cells, subcellular components, viruses, liposomes, niosomes, microspheres and nanospheres, or even smaller entities such as macro-molecules, proteins, DNA, RNA, etc., and drops of a fluid immiscible in a suspension medium, for example oil in water, or water in oil, or also drops of liquid in a gas (such as water in air) or, further, bubbles of gas in a liquid (such as air in water).

At times the term cell will be used, but where not otherwise specified, it shall be understood as a non-limiting example of particles in the wider sense described above.

Further characteristics and advantages of the invention will clearly emerge from the following description of some of its non-limiting embodiments, with reference to the figures of the accompanying drawings.

DETAILED DISCLOSURE

Figure 1:
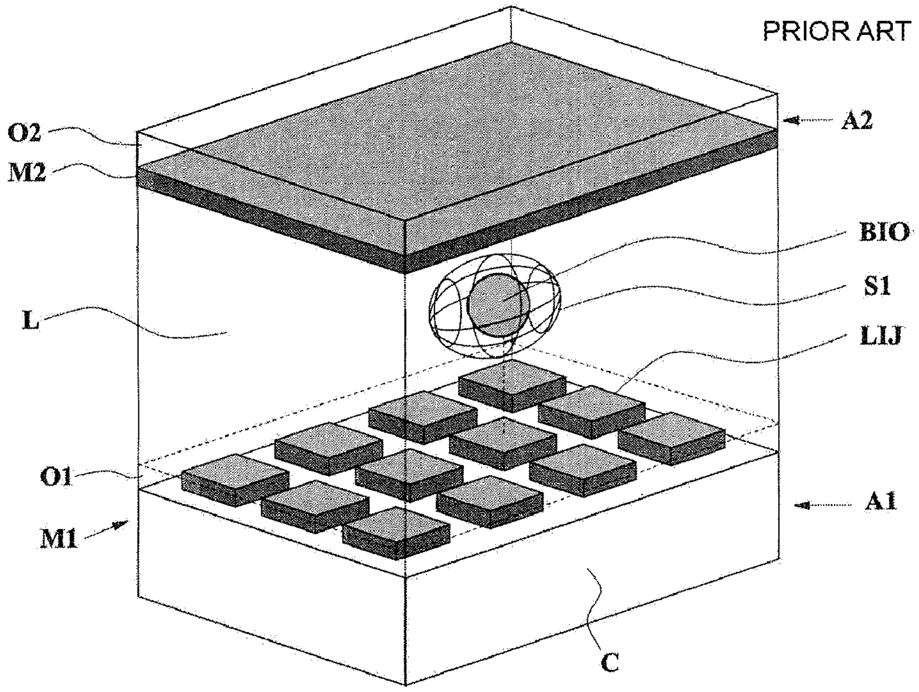
FIG. 1 shows a diagram of the device for the manipulation of particles by means of closed dielectrophoretic cages, according to the known art.

The object of the present invention is to provide a method and a device or apparatus for the manipulation and stable control of single particles or groups of particles by dielectrophoretic force, so as to obtain one or more of the following advantages with respect to the known art:

- greater accuracy in the control of the position of the particles;
- reduction of the undesired effects due to the presence of parasite cages;
- reduction of power consumption.

Dielectrophoretic Force

Dielectrophoresis is a physical phenomenon by which a net force is exerted on a dielectric body when it is subjected to a non-uniform continuous and/or alternating electric field, said force acting towards the spatial regions in which the intensity of the field is increasing (pDEP) or decreasing (nDEP). If the intensity of the forces is comparable to that of the weight force, it is possible, in principle, to create a balance of forces to obtain the levitation of small bodies. The intensity of the dielectrophoretic force, like the direction in which it acts, depends on the dielectric and conductive properties of the body and the medium in which the body is immersed, properties which vary according to the frequency. According to the classic theory of force we can write:

$$\vec{F}(x,y,z,\omega)=2\pi\epsilon_0\epsilon_m R^3\mathfrak{R}\{f_{CM}(\omega)\}\vec{\nabla}E_{(RMS)}^2 \quad (1)$$

in which $\epsilon_0$ and $\epsilon_m$ represent the permittivity of vacuum and of the suspension medium respectively, R is the particle radius, $f_{CM}$ the Clausius-Mossotti factor and $E_{RMS}$ the root-mean-square value of the electric field.

Assuming the particle to be a sphere having mass M and radius R, immersed in a fluid with viscosity η, the equation that governs the dynamics of the system is the following:

$$M\frac{d^2\vec{r}(t)}{dt} = \vec{F}(t) - V(\rho_p - \rho_m)g\hat{k} - 6\pi R\eta\frac{d}{dt}\vec{r}(t) \quad (2)$$

where $\rho_p$ and $\rho_m$ indicate the mass density of particle and medium respectively and g is the gravitational acceleration. If we assume for the sake of simplicity that the force acts in the vertical direction and that the weight force does not act on the system, then we will have:

$$M\frac{d}{dt}z'(t) = F(t) - 6\pi R\eta z'(t) \quad (3)$$

where the superscript indicates the derivative with respect to time. In the domain of the frequencies, we can write:

$$Mj\omega Z'(\omega) = F(\omega) - 6\pi R\eta Z'(\omega) \quad (4)$$

from which the system transfer function is obtained:

$$H(\omega) = \frac{Z'(\omega)}{F(\omega)} = \left(\frac{1}{6\pi R\eta}\right)\frac{1}{1 + j\omega\tau} \quad (5)$$

in which $$\tau = \frac{M}{6\pi R\eta} \quad (6)$$

is defined.

If for example we consider a particle with a radius of 50 μm with unitary mass density immersed in water at a temperature of 20° C., the cut-off pulsation is 1.8 kHz. Therefore periodical variations of forces with pulsations above this value are filtered by the particle-liquid system which undergoes exclusively the mean effect thereof. The main result of the above is that if we apply N different configurations in a sequential manner (deterministic or chaotic) with repetition frequency (in the case of periodic repetition of the sequence) higher than the cut-off frequency of the inertial system of the particles, the effect on the particle is substantially due to the mean effect in time.

Overlapping of Effects Applied to Dielectrophoresis

For the sake of simplicity, but without limitations to the generality of the theory, we shall limit ourselves to considering the particular case in which all the N configurations of sinusoidal potentials that generate the N fields of dielectrophoretic force are periodicals with pulsation ω. Said N configurations are applied in time sequence, for the sake of simplicity in a deterministic and non-chaotic way. Let T be the repetition period of said time sequence and $\Delta t_i$ the time window in which each configuration "i" is applied. We define a function which associates a time succession of periodic field configurations with each point in space; said function can be represented as follows:

$$\vec{E}(x, y, z, \omega, t) = \sum_{i=1}^{n}\left[\vec{E}_i(x, y, z, \omega)C_i(t)\right] \quad (7)$$

where E represents the electric field and where we have defined:

$$C_i(t) = \begin{cases} 1 & iT < t < iT + \Delta t_i \\ 0 & iT + \Delta t_i < t < (i+1)T. \end{cases} \quad (8)$$

Figure 2:
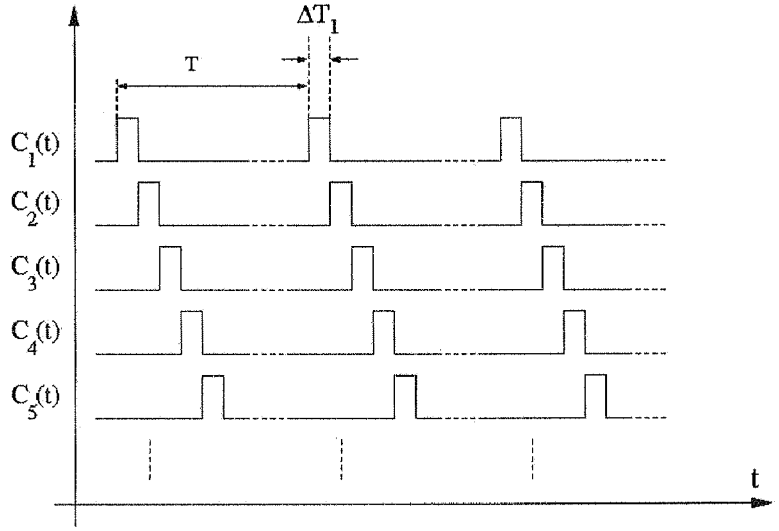
FIG. 2 shows a sequence of the time slots in which different configurations of potentials are applied.

The overall field is given by the algebraic sum of N configurations of field $E_i$ each of which has effect in a time window determined by the function $C_n$ as shown better in FIG. 2.

It is also possible to express a force for each configuration of electric field; said force can be expressed as the gradient of a scalar function which we identify as potential of the dielectrophoretic force:

$$\vec{F}_i(x,y,z,\omega) = -\vec{\nabla}U_i^{dep}(x,y,z,\omega) = \beta(\omega)\vec{\nabla}E_{i(RMS)}^{2} \quad (9)$$

in which we have defined:

$$\beta(\omega) = 2\pi\epsilon_0\epsilon_m R^3\mathfrak{R}\{f_{CM}(\omega)\} \quad (10)$$

The term β summarises all the properties of the medium and particle and is a function independent of the geometry of the system and of the spatial characteristics of the field applied; it depends on the pulsation of the electric field.

We can write the total dielectrophoretic potential as a sum of the potentials of each configuration multiplied by the time function which identifies the time slot for application of each configuration; in other words we can write:

$$\vec{F}(x, y, z, \omega, t) = \sum_{i=1}^{n}\left[-\vec{\nabla}U_i^{dep}(x, y, z, \omega)C_i(t)\right]. \quad (11)$$

Due to the fact that the function $C_i$ does not contain the spatial variable, said expression can be reformulated in simple algebraic steps as follows:

$$\vec{F}(x, y, z, \omega, t) = -\vec{\nabla}\left\{\sum_{i=1}^{n}\left[U_i^{dep}(x, y, z, \omega)C_i(t)\right]\right\}. \quad (12)$$

It is therefore possible to define the overall dielectrophoretic potential as follows:

$$U_{dep}(x, y, z, \omega, t) = \sum_{i=1}^{n}\left[U_i^{dep}(x, y, z, \omega)C_i(t)\right]. \quad (13)$$

At this point it is sufficient to re-write this time function as a Fourier expansion as follows:

$$U_{dep}(x,y,z,\omega,t) = \langle U_{dep}(x,y,z,\omega,t)\rangle + \ldots \quad (14)$$

where the symbol < > indicates the time mean calculated as an integral with respect to the time variable (in the domain T) divided by the period. If the repetition period of the configurations is below the limit of the cut-off frequency of the liquid-particle system transfer function, then we can ignore the higher order terms and consider only the constant term, i.e. if:

$$T < \frac{M}{6\pi R\eta} \tag{15}$$

then:

$$\langle U_{dep}(x, y, z, \omega, t)\rangle = U_{dep}^{(0)}(x, y, z, \omega) = \left\langle \sum_{i=1}^{n} \left[U_i^{dep}(x, y, z, \omega)C_i(t)\right]\right\rangle. \tag{16}$$

The potential function can obviously be within the integral because it does not contain the time variable and we can therefore write:

$$U_{dep}^{(0)}(x, y, z, \omega) = \sum_{i=1}^{n} \left[U_i^{dep}(x, y, z, \omega)\langle C_i(t)\rangle\right]. \tag{17}$$

Redefining:

$$\langle C_i(t)\rangle = C_i^{(0)} \tag{18}$$

we obtain the final expression:

$$U_{dep}^{(0)}(x, y, z, \omega) = \sum_{i=1}^{n} \left[U_i^{dep}(x, y, z, \omega)C_i^{(0)}\right] \tag{19}$$

from which:

$$\vec{F}(x, y, z, \omega, t) = -\vec{\nabla}\{U_{dep}^{(0)}(x, y, z, \omega)\} = -\vec{\nabla}\left\{\sum_{i=1}^{n} \left[U_i^{dep}(x, y, z, \omega)C_i^{(0)}\right]\right\}. \tag{20}$$

This means that point by point the total potential of the dielectrophoretic force is given by the sum of all the dielectrophoretic potentials (the various configurations that alternate do not necessarily have to be produced with electric fields alternating at the same frequency) of each configuration which alternates in time multiplied by a weight which is given by the time mean of the function $C_i$ which represents the duration with respect to the repetition period of said configuration.

Recalling the definition of the time function of $C_i$ we can write:

$$C_i^{(0)} = \frac{\Delta t_i}{T} \tag{21}$$

hence:

$$\vec{F}(x, y, z, \omega) = -\vec{\nabla}\{U_{dep}^{(0)}(x, y, z, \omega)\} = -\vec{\nabla}\left\{\sum_{i=1}^{n} \left[U_i^{dep}(x, y, z, \omega)\frac{\Delta t_i}{T}\right]\right\}. \tag{22}$$

In other words we can write:

$$\vec{F}(x, y, z, \omega) = \beta(\omega)\sum_{i=l}^{n} \left[\frac{\Delta t_i}{T}\vec{\nabla}E_{i,RMS}^2(x, y, z, \omega)\right]. \tag{23}$$

This expression is valid in the particular case in which the electric field that generates each configuration has pulsation ω. In more generic terms, if each configuration that contributes to the total force is characterised by a different pulsation of the electric field, then the expression becomes the following:

$$\vec{F}(x, y, z) = \sum_{i=1}^{n} \left[\frac{\Delta t_i}{T}\beta_i(\omega_i)\vec{\nabla}E_{i,RMS}^2(x, y, z, \omega_i)\right]. \tag{24}$$

This formula mathematically represents the concept of overlapping of effects. In other words, the dielectrophoretic force is given by the sum of the various contributions of each electric potential configuration which alternates in time, the weight of each of the configurations being determined by the duration of the interval in which said configuration persists. The main consequence of this analysis is that it is possible to produce closed dielectrophoretic cages not corresponding to electric field relative minimums as is evident from the following example.

We consider a spatial domain Ω. We assume:

$$\forall i,\ \forall(x,y,z)\notin\Omega,\ \vec{\nabla}U_i^{dep}(x,y,z,\omega)\neq 0 \tag{25}$$

and:

$$\forall i \text{ pari } U_i^{dep}(x,y,z,\omega)=U_{i+1}^{dep}(-x,-y,-z,\omega) \tag{26}$$

then:

$$\sum_{k\in\{x,y,z\}} \frac{\partial U_i^{dep}(x, y, z, \omega)}{\partial k}\hat{k} \neq 0. \tag{27}$$

In the case of total force:

$$\sum_{k\in\{x,y,z\}} \left(\sum_{i=l}^{n} \frac{\partial U_i^{dep}(x, y, z, \omega)}{\partial k}\right)\hat{k} = 0. \tag{28}$$

This shows that it is possible to produce closed dielectrophoretic cages even without a local minimum of the electric field.

It should be observed that the overlapping of the effects of various configurations of potential is a consequence of their application in time succession. If, in fact, these configurations were applied simultaneously, the resulting total force would be different. It is possible to demonstrate, for example, that the sum of configurations of potentials that provide, point by point, a constant electric potential value can give rise to a non-null dielectrophoretic force if applied individually in time succession.

As a further generalisation of the theory, we consider the case in which the electric field is periodic; in this case it is possible to demonstrate that the resulting dielectrophoretic force is the following:

$$\vec{F}(x, y, z) = \sum_{i=1}^{n} \left\{ \frac{\Delta t_i}{T} \sum_{j=1}^{\infty} \left[ \beta_j(\omega_j) \vec{\nabla} E_{i,RMS}^2(x, y, z, \omega_j) \right] \right\} \quad (29)$$

Method for the Production of Closed Dielectrophoretic Cages Obtained by Means of an Electrode Array It is an object of the present invention to provide a method for producing closed dielectrophoretic cages (not necessarily corresponding to local minimums of the respective dielectrophoretic potential) by means of which to trap electrically neutral particles in a stable manner; this is done by applying a succession of configurations of electric potentials to an array of electrodes; said potentials are characterised preferably but not exclusively by periodic functions with null mean value in phase or in counter-phase; each of said potential configurations can give rise to an electric field which has one or more electric field local minimums or may not have any electric field local minimum; depending on the type of configurations applied and the time sequence in which they follow one another, the effect of said configurations can give rise to one or more of the following phenomena:

- closed dielectrophoretic cages
- rotating fields
- travelling waves
- dielectrophoretic parasite cages
- electro-thermal-flow It is possible to determine an appropriate, set of configurations to be applied to the electrode array following an appropriate time succession which enables or inhibits each of the effects listed; as a non-limiting example for the purposes of the present invention, some examples of possible different successions that can be used are described below:

- deterministic periodical: the succession of configurations follows a periodic trend so that each configuration is applied for a constant time duration and is repeated after a period of time T common to all the configurations;
- chaotic: the succession of configurations follows a non-deterministic trend. The duration of each configuration in turn can be constant or random.

Figure 3:
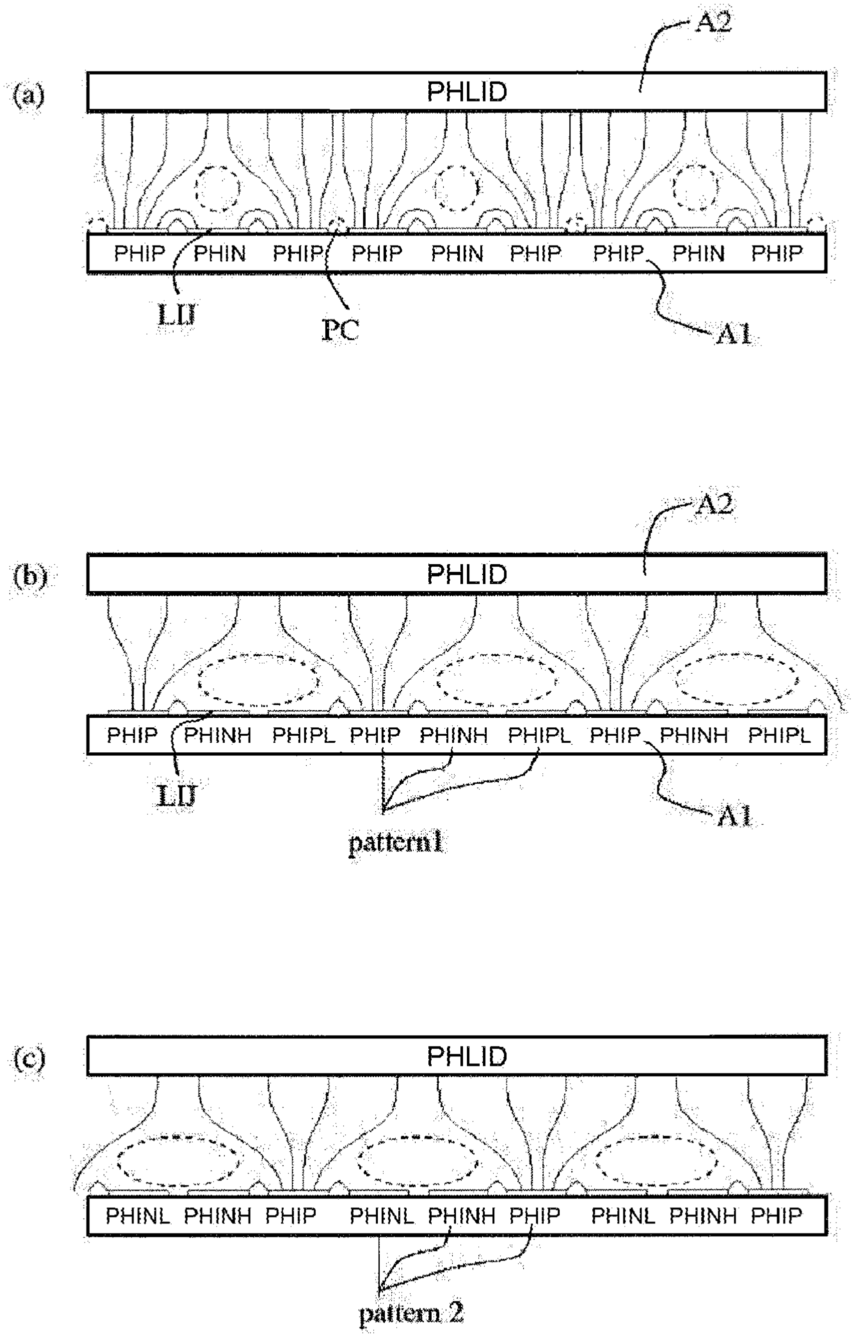
FIG. 3 shows the configurations of potentials to produce closed dielectrophoretic cages in a one-dimensional array of electrodes according to the known art (a) and according to an aspect of the present invention (b) and (c)

By way of example FIG. 3(*a*) shows a configuration of potentials in negative phase (PHIN and PHILID) and positive phase (PHIP) applied to the electrodes (LIJ) of a device, such as the one illustrated in FIG. 1 (which in FIG. 3 is illustrated in a vertical section), in order to produce an array of dielectrophoretic cages (S1). As a consequence of this, parasite cages (PC) occur (between adjacent electrodes having the same phase), which can trap particles in a stable manner.

Figure 4:
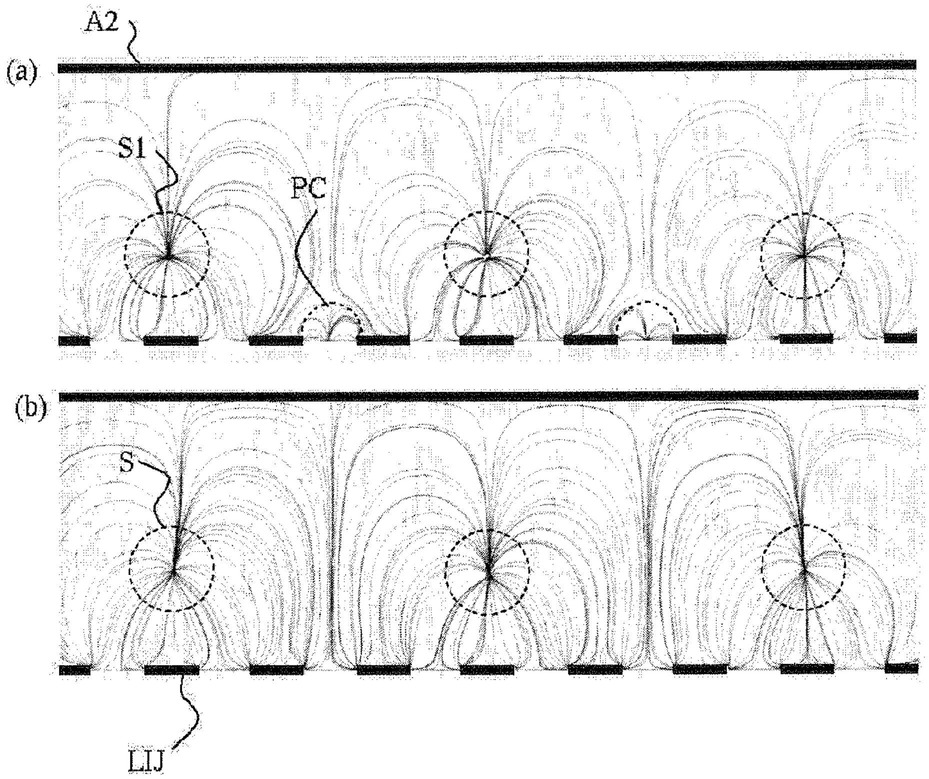
FIG. 4 shows the dielectrophoretic field lines according to the known art (a) and according to the present invention (b)

According to the present invention said parasite cages can be eliminated by applying an appropriate series of configurations in time succession; in the case in point, two configurations (pattern1 and pattern2) shown in FIG. 3(*b*) and FIG. 3(*c*) are sufficient; said configurations are applied each for a time interval of T/2, with T chosen in accordance with the theory illustrated; in this regard the following potentials are used: PHINL, PHINH, PHIP and PHILID, where PHINL and PHINH correspond to two potentials both in negative phase, but with different amplitude, for example one (PHINH—H=high) twice the other (PHINL—L=low). From the comparison of the effect of the various configurations, represented by the broken lines, shown in FIG. 3 (*a*),(*b*),(*c*) in which the same electrodes are vertically aligned, the effect of the application of the two configurations pattern1 and pattern2 is evident, in which, corresponding to the same electrode to which PHINH is applied and which corresponds to an electrode to which in FIG. 3(*a*) (state of the art) the potential PHIN is applied, PHINL potentials are applied first to the electrode immediately adjacent on the right (pattern1) and then to the electrode immediately adjacent on the left (pattern2), while PHINL is applied to the electrode in one of the two configurations, and in the other configuration PHIP is applied (or the same potential in counter-phase, which in the case of the state of the art of FIG. 1(*a*) is always applied to both said electrodes). As a result of the application in time sequence of said two configurations, the dielectrophoretic cages closed but "deformed"—in the sense that they are "elongated" on two adjacent electrodes—which form as a consequence of application of the configurations pattern1 and pattern2 generate the same effect as a closed dielectrophoretic cage located on one single electrode (PHINH in the case illustrated), which corresponds to the same electrode on which the equivalent closed cage S1 is located in FIG. 1(*a*) (to which PHIN is applied), but without the generation of parasite cages PC, which cannot be formed as the flow lines of the electric field close up in both configurations, pattern1 and pattern2, in a different way from the "traditional" configuration of FIG. 1(*a*), thus preventing the formation of closed PC cages therefore able to trap any particles present between the electrodes A2 and LIJ. FIG. 4 shows the lines of the dielectrophoretic field resulting from the simulations in the case in which a static configuration (a) is applied, as in the state of the art, and in the case in which dynamic configurations (b) are applied, according to the invention. In both cases dielectrophoretic cages are present; however, in the first case parasite cages are also present while in the second case there are no parasite cages.

Figure 6:
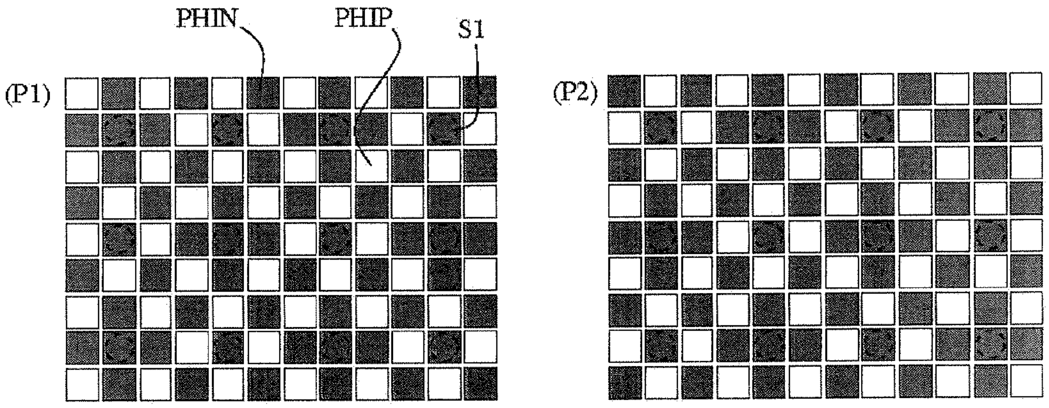
FIG. 6 shows a possible set of configurations of potentials to produce closed dielectrophoretic cages according to the present invention in a two-dimensional array of electrodes.

It is obvious that alternative configurations can be determined to obtain similar results in devices with a different number and form of electrodes arranged in both one and two dimensions. By way of example FIGS. 6, 7, 9, 10 show some examples of possible configurations applied in periodic sequence for the realisation of an array of closed dielectrophoretic cages in two dimensions. FIG. 6 illustrates (this time in a plan view) a situation analogous to that of FIG. 3 (*b, c*) in which two alternate configurations P1 and P2 are applied on each half of the electrodes surrounding the electrode on which the cage S1 will be realised, but only two potentials of the same amplitude PHIN and PHIP are used, as in the "traditional" case. All the dark-coloured electrodes of the array have the potential PHIN applied, while the other electrodes of the array (light-coloured) have the potential PHIP applied.

In this case, the effect of the time sequence application (the same as FIG. 3(*b, c*)) of the configurations P1 and P2 illustrated necessarily leads to the formation, in the case of both configurations P1 and P2, of non-closed (open) dielectrophoretic cages as they are not located in an electric field minimum; however, the result of the application in time sequence of configurations P1 and P2 is the generation of a closed dielectrophoretic cage S1 on the only electrode to which in both configurations P1 and P2 the same potential PHIN remains applied (electrode always grey).

Figure 7:
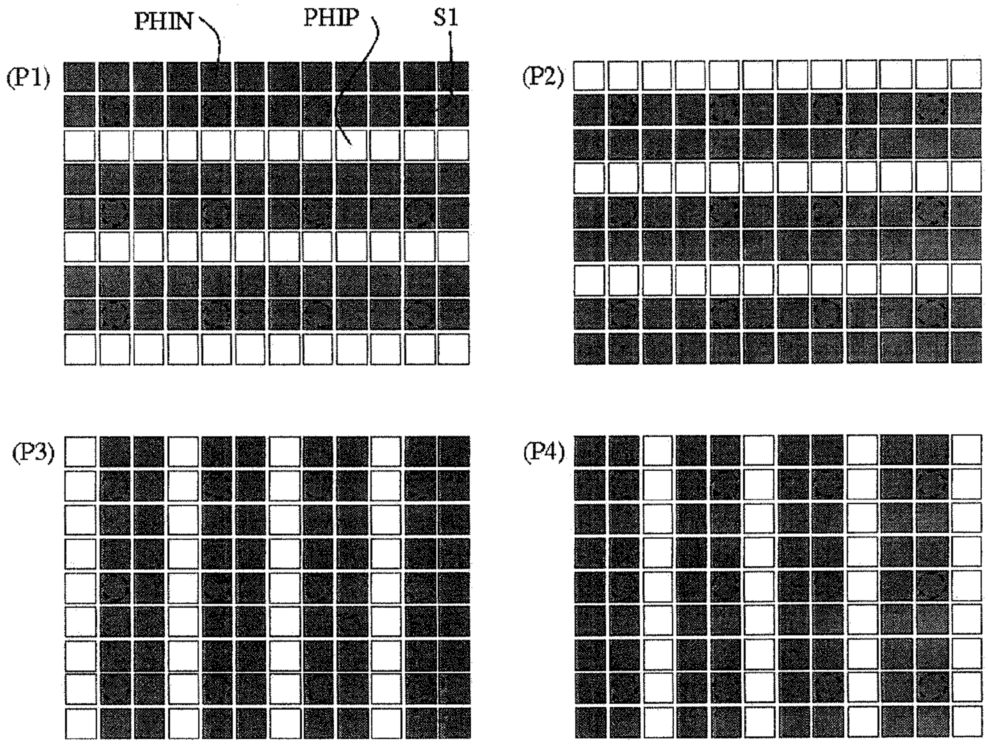
FIG. 7 shows a further set of configurations of potentials to produce closed dielectrophoretic cages according to the present invention in a two-dimensional array of electrodes.
Figure 9:
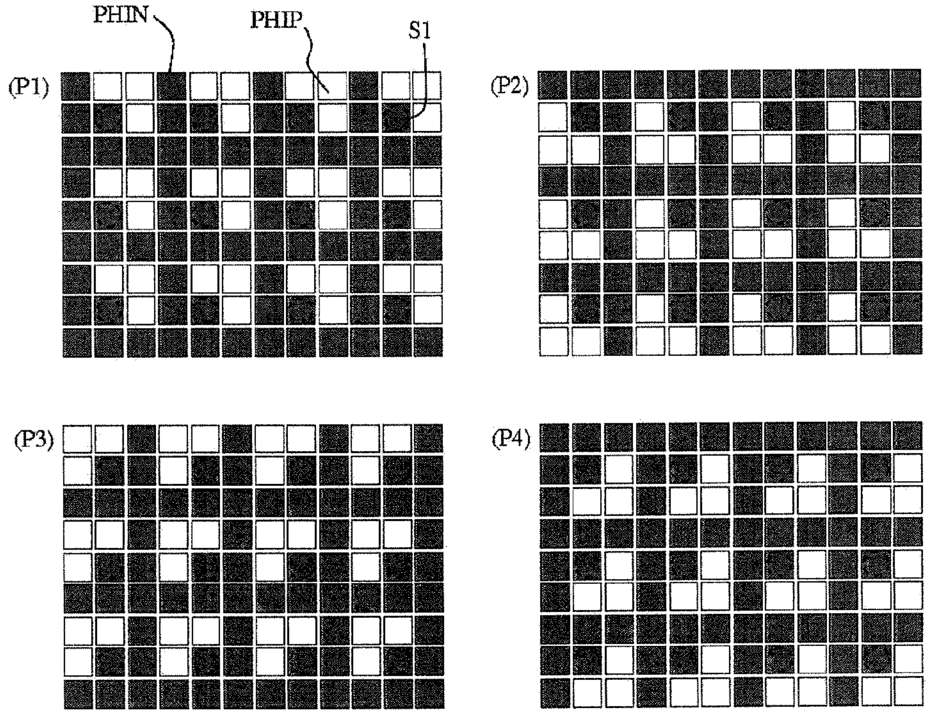
FIG. 9 shows a further set of configurations of potentials to produce closed dielectrophoretic cages according to the present invention in a two-dimensional array of electrodes.
Figure 10:
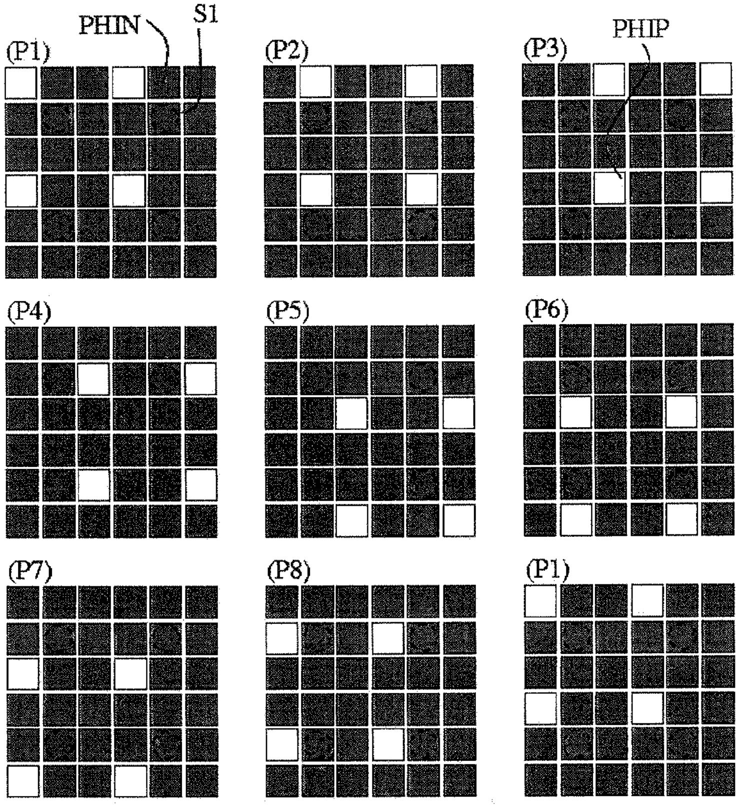
FIG. 10 shows a further set of configurations of potentials to produce closed dielectrophoretic cages according to the present invention in a two-dimensional array of electrodes.

FIGS. 7 and 9 show cases of application of four different configurations (patterns) P1, P2, P3, P4 alternating the two potentials PHIP and PHIN on the various electrodes; the configurations adopted are in turn different in FIG. 7 and in FIG. 9. FIG. 10 illustrates the case in which eight different configurations are applied P1, . . . P8, in practice "rotating" the electrode to which the PHIP potential in counter-phase (light-coloured) is applied each time with respect to the electrode on which the cage S1 is positioned.

Figure 5:
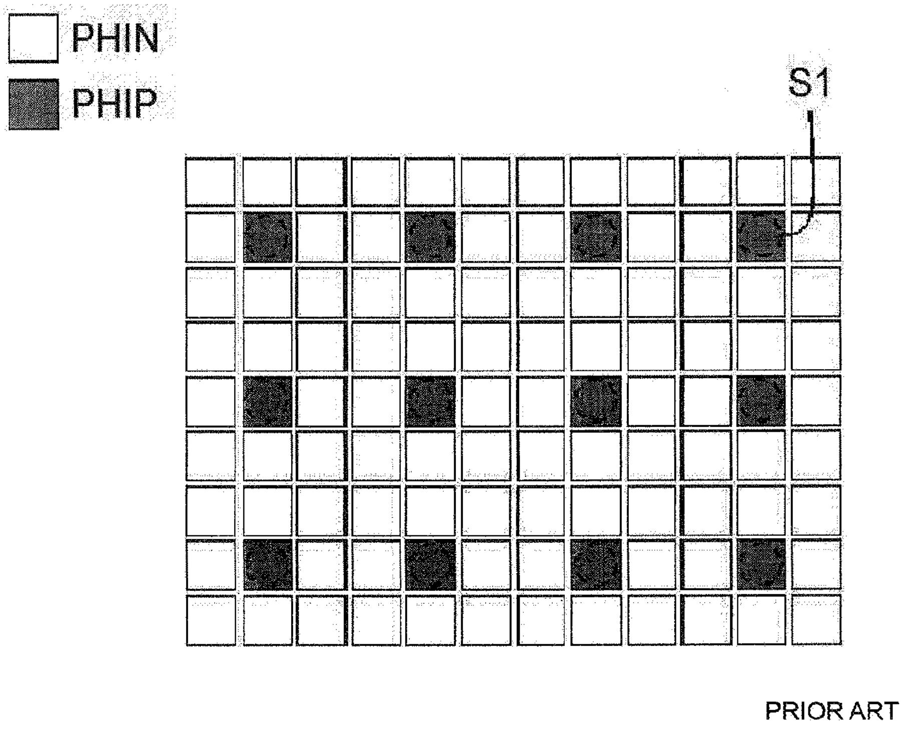
FIG. 5 shows the configurations of potentials to produce closed dielectrophoretic cages according to the known art in a two-dimensional array of electrodes.
Figure 8:
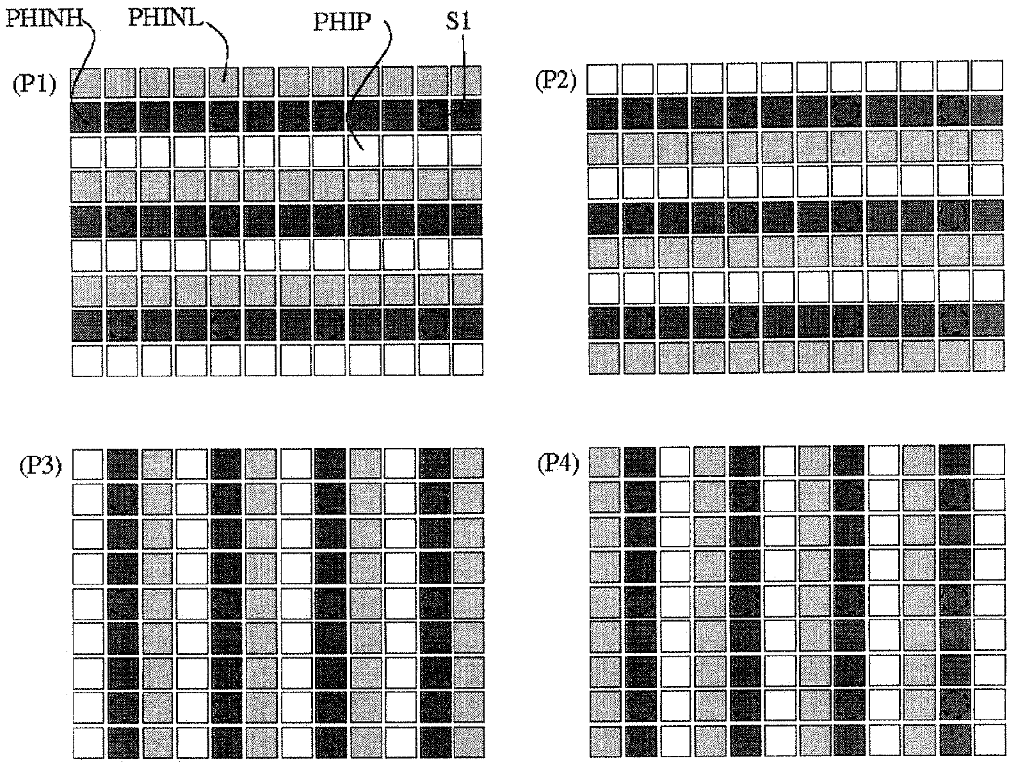
FIG. 8 shows a further set of configurations of potentials to produce closed dielectrophoretic cages according to the present invention in a two-dimensional array of electrodes.

Lastly it is also possible (FIG. 8) to use a set of "mixed" configurations, in which two potentials in negative phase of different amplitude are used (PHINL and PHINH—as in the case of FIG. 3*b,c*) applied in time succession to the electrodes around the same electrode to which PHINH (darker grey) is always applied and on which the closed cage S1 is realised, together with PHIP counter-phase (light-coloured) potentials. In practice, by applying the method of the invention, the same result is obtained as the one obtained by means of a static configuration according to the known art, shown in FIG. 5, i.e. the generation of closed dielectrophoretic cages in which single particles can be trapped; the main advantage of the method according to the invention with respect to the known art is the possibility of using smaller electrodes, maintaining constant the spatial repetition pitch between the electrodes and consequently increasing the impedances between the electrodes, thus reducing the power dissipation without causing an increase in the dimensions of the basin of attraction of the parasite cages and, at the same time, without causing the generation of parasite cages.

Figure 15:
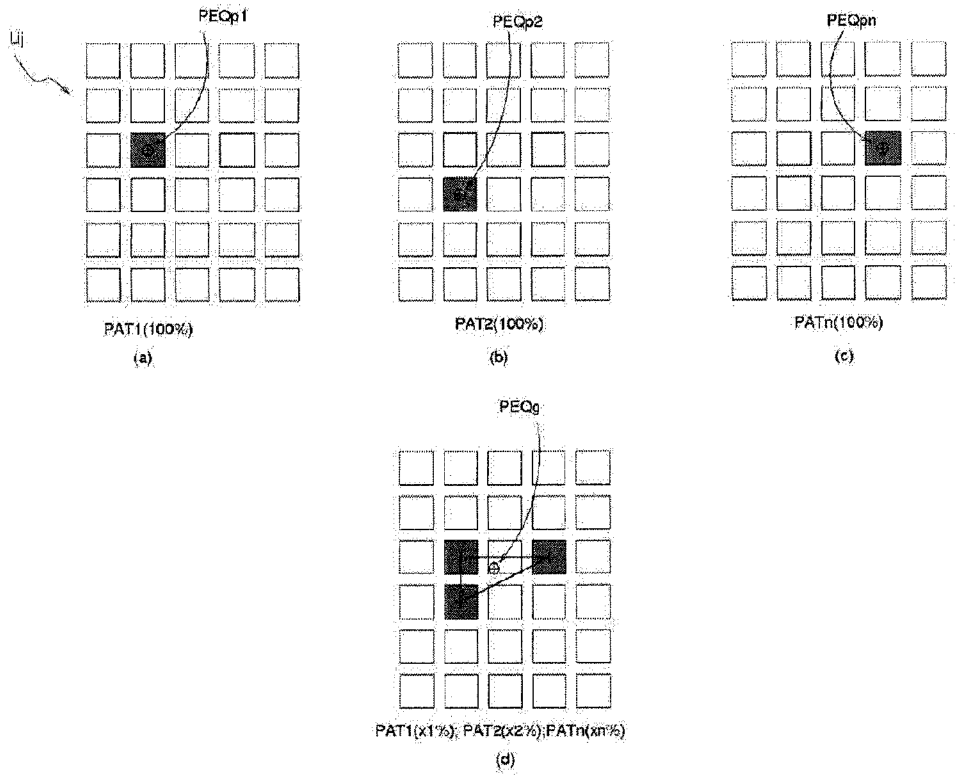
FIG. 15 shows, schematically, a plan view of the result of the application of n field configurations to an array of electrodes according to any one of the methodologies illustrated in FIGS. 6-10.

Basically (FIG. 15), for any succession of field configurations PEQp1, . . . PEQpn applied in time T (FIG. 15 (*a*), (*b*) and (*c*)), the final result obtained is always that of a sort of "equivalent configuration" (FIG. 15(*d*)) which can also be determined graphically, in which the centre of the closed dielectrophoretic cage actually obtained (marked by the circle with the cross) is in the "centre of gravity" of the n configurations applied in succession, corresponding, in the case in point, to the centre of gravity of the triangle obtained by joining the centres of the electrodes to which the potential PEQp1, . . . n has been applied in succession.

Obviously once the closed cages S1 have been generated according to the method of the invention, they will be movable along a controlled path, which can be pre-set during programming of the electrodes, by selectively varying the voltage configurations applied to the electrodes of the array so as to generate, in sequence, a succession of closed cages along said controlled path. All the numerous methods described in the state of the art based on the displacement/manipulation of closed dielectrophoretic cages containing one or more particles can therefore be implemented, operating according to the method described to obtain the generation of closed cages.

Apparatus for the Manipulation of Particles by Overlapping the Effects of Dielectrophoretic Configurations Is is also an object of the present invention to provide an apparatus or device by means of which the method described can be realised in an advantageous manner. Due to the need to rapidly alternate over time various configurations (patterns) of voltages (Vp, Vn) applied to the electrodes, there is the problem of updating the configurations. If the electrode array is very large (e.g. 10,000 or 1,000,000) the time for reprogramming the array may be incompatible with the alternation speed of the configurations. It is therefore desirable to have, for each micro-site associated with the electrodes, a memory cell which regulates the current configuration, so that the alternation of configurations can be obtained without reintroducing the data from the outside in serial mode, but simply by globally switching the programming between the various configurations stored locally.

Figure 12:
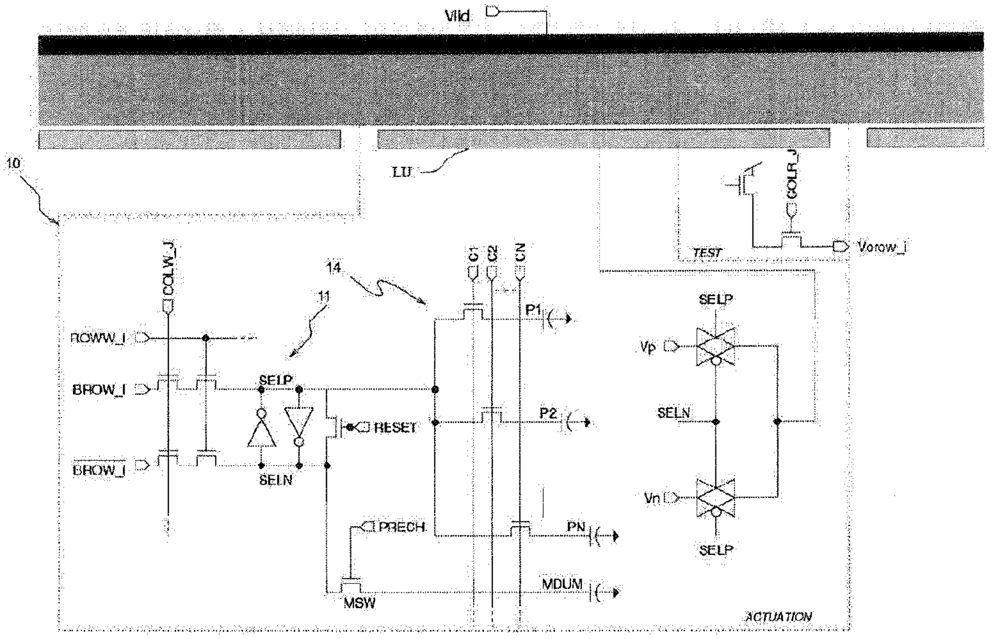
FIG. 12 shows a schematic preferential embodiment of a device according to the present invention, in particular suitable for the implementation of the methods based on the use of the configurations of potentials illustrated in the Figures from 6 to 10.
Figure 13:
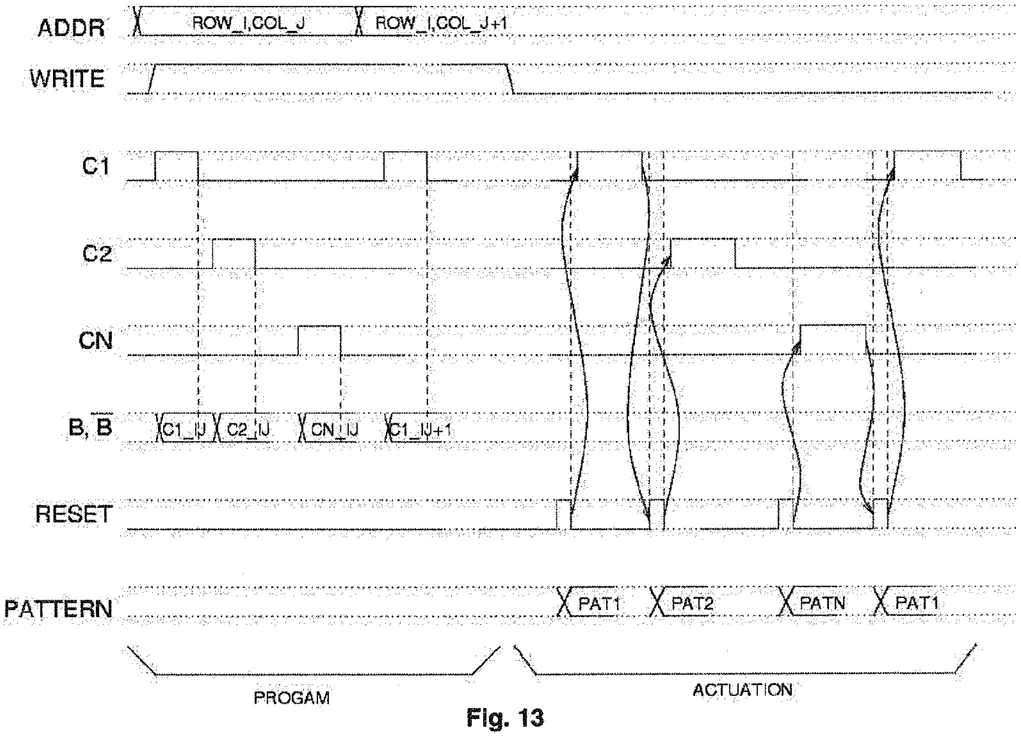
FIG. 13 shows the waveforms for the use of a preferential embodiment of the device according to the present invention.

FIG. 12 shows a circuit scheme according to the present invention, particularly suitable for the purpose of rapidly alternating various configurations. The actuation part contains an addressing circuit 10 for a static memory 11 consisting of two feedback inverters, the outputs of which (SELP, SELN) determine whether the voltage Vp or Vn is applied to the electrode (LIJ). The n configurations necessary for operating the circuit are stored locally by means of dynamic memories 14. The dynamic memories 14 are refreshed every time the configuration is activated. FIG. 13 shows the sequence of waveforms relative to programming and actuation.

The dynamic memories 14 are loaded initially during the programming phase, and are used periodically during the actuation phase. Before every use, voltages SELP, SELN are re-set to the value corresponding to the unstable equilibrium point of the static memory cell and, after deactivation of the RESET, closing of the switch which connects the nodes of the static RAM to the capacitors constituting the dynamic memory causes the switching of the static memory towards the new configuration and the refreshing of the dynamic memory.

Dynamic memories can consist of pairs of capacitors (P1, M1, . . . PN, MN), as in FIG. 12, which could be produced—to use a CMOS standard technology—with a transistor with drain and source short-circuited (as earth terminal) and with the gate as another plate of the capacitor.

Figure 14:
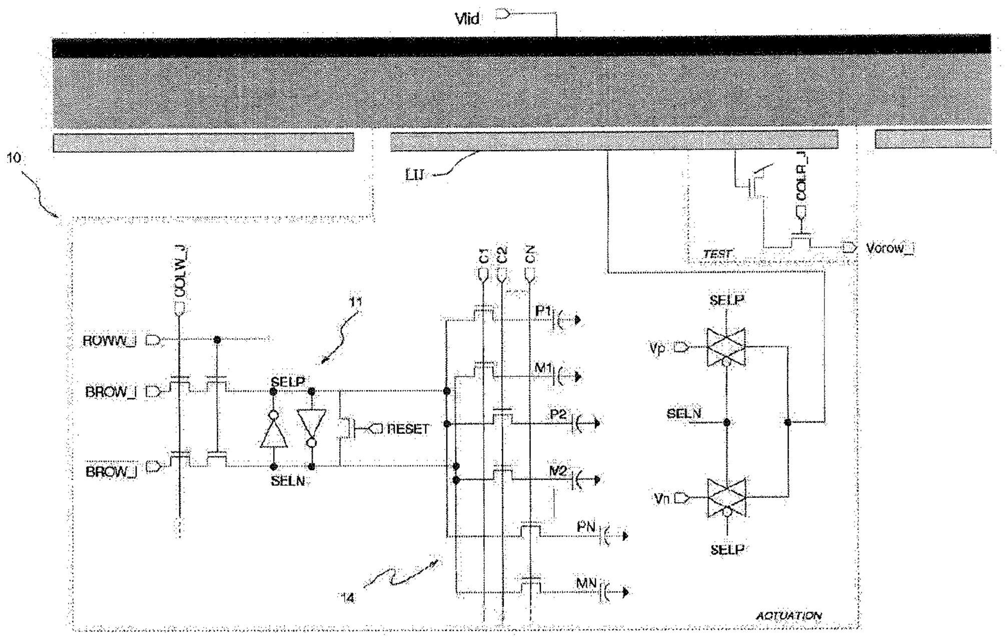
FIG. 14 shows schematically a preferred embodiment alternative to that of FIG. 12 of a device suitable for the implementation of the methods based on the use of the configurations of potentials illustrated in Figures from 6 to 10.

An even more compact embodiment (FIG. 14) provides for the use of one single capacitor (P1, . . . PN) for each configuration plus one single dummy capacitor (MDUM) connected to the other output of the static memory 11, which is preloaded during the RESET phase in the unstable equilibrium point of the static memory 11. The preload occurs by activating the PRECH signal during the active RESET phase. PRECH can then be deactivated and reactivated immediately after, simultaneously with one of the selection signals of the configuration (C1, . . . , CN).

The equipment described above in two preferred embodiments permits simultaneous activation of the sequence configuration on the whole electrode array, simply by activating the global signals RESET and C1, CN as appropriate.

For testing the circuit it is also advisable to realise for each electrode $L_{IJ}$ an auxiliary test circuit (TEST), which indicates by means of a source follower, line by line, the voltage applied to the electrode of a selected column.

Figure 11:
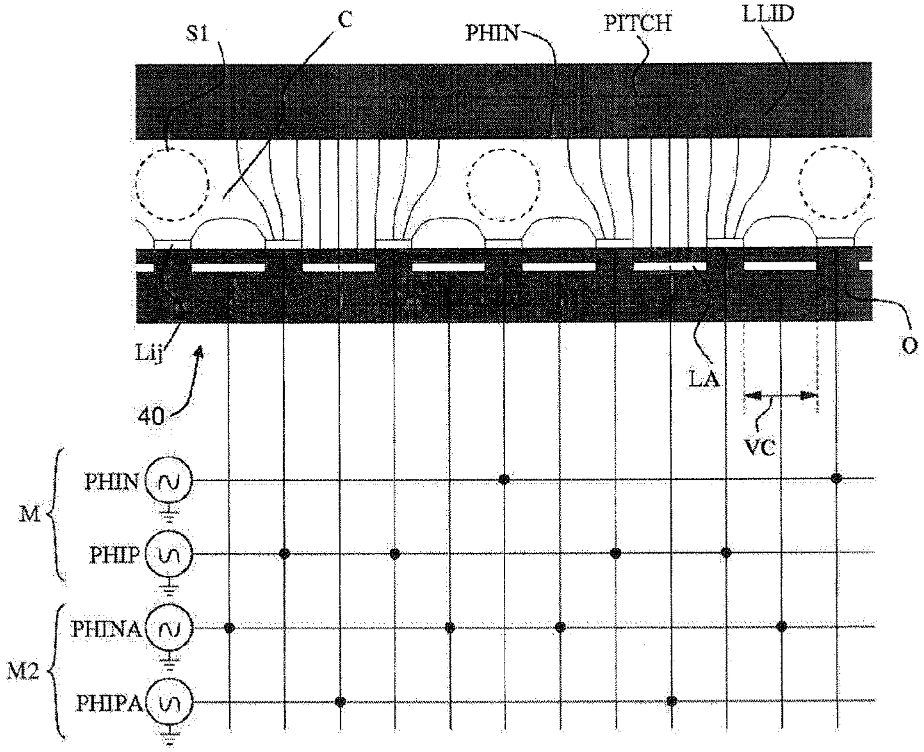
FIG. 11 shows a sectioned elevation view of a device consisting of a one-dimensional array of electrodes using auxiliary electrodes.

Method for the Reduction of Power Dissipation and Effects of Parasite Cages by Means of Auxiliary Electrodes A further method (and device) for reducing the effects of the associated parasite cages is shown schematically in FIG. 11. In said case auxiliary potentials are used in addition to the normal potentials applied according to the state of the art; the function of the auxiliary potentials is that of increasing the intensity of the field corresponding to the regions containing electrodes to which potentials with the same phase are applied; these regions in fact normally determine the creation of parasite cages; when reciprocally in-phase potentials are applied, a local minimum of the electric field corresponding to a minimum of the dielectrophoretic potential is created in this region.

According to the present invention it is necessary to apply a further potential (PHIPA) with the same phase but greater amplitude; the amplitude of the potential in particular can be chosen in order to have, on the surface of the chip, an amplitude equal to or greater than the potential PHIP; in this way there is no electric field minimum in this region. Said auxiliary potentials assume null value or negative phase PHINA or can remain floating in the regions in which opposite phases are applied; in fact, parasite cages do not normally occur in said regions; variations are possible to the number, form and relative position of the electrodes used to apply said auxiliary potentials just as variations are possible to the amplitude, frequency and phase of the auxiliary potentials according to the present invention.

Apparatus for the Reduction of Power Dissipation and of the Effects of Parasite Cages by Means of Auxiliary Electrodes It is also an object of the present invention is to provide an apparatus which permits realisation of the method described above. With reference to FIG. 11, for the manipulation of particles by means of closed dielectrophoretic cages S1, a device is used which comprises an array of first electrodes Lij which can be individually addressed and activated, at least one second electrode LLID positioned facing towards and spaced apart from the first electrodes Lij, a chamber C suitable for containing in suspension the particles in a fluid medium, and means M to generate around at least one particle an electric field variable over time by means of the electrodes Lij and the electrode LLID.

In the case in point the chamber C is delimited between the array of first electrodes Lij and the second electrode LLID; the means M include means (known and not illustrated for the sake of simplicity) for applying to at least one first group of first electrodes Lij of the array, at each of which a cage S1 will be generated, a voltage configuration PHIN in phase with a voltage configuration PHIN applied to the electrode LLID; and for applying to at least one second group of electrodes Lij immediately surrounding each cage S1 to be generated a voltage configuration PHIP in counter-phase with the voltage configuration applied to the second electrode LLID.

According to the invention, the device furthermore comprises means 40 to generate a localised increase in intensity of the electric field in regions of the chamber C containing, positioned immediately adjacent to one other, electrodes Lij to which voltage configurations having identical phase are applied, comprising an array of third electrodes $L_A$ arranged near the electrodes Lij, each substantially corresponding to a separation and insulation gap VC between one respective pair of first adjacent electrodes Lij.

The device furthermore comprises means M2 for selectively applying to at least one selected group of third electrodes $L_A$ arranged near first electrodes Lij to which voltage configurations PHIP (or PHIN) with identical phase are applied during use, a voltage configuration PHIPA (or PHINA) having phase identical to the one applied to said first electrodes, but with greater amplitude.

The array of first electrodes Lij and the array of third electrodes $L_A$ are supported by the same electrically insulating substrate O, at different distances from an outer surface of the substrate delimiting the lower bound of the chamber C. The third electrodes $L_A$ are preferably arranged below the first electrodes Lij with respect to the cited outer surface of the substrate O.

The invention claimed is:

1. A method for the manipulation of particles comprising generating a succession of a plurality of different field of force configurations over a time interval, wherein effects of the plurality of different field of force configurations overlap to result effectively in a single field of force acting on the at least one particle, wherein a resulting effect of the field of force on said at least one particle is different from the effect of each configuration of said plurality of different field of force configurations taken individually, the resulting effect of the field of force trapping the at least one particle at approximately the same point during the time interval and wherein the generating the succession of the plurality of different field of force configurations comprises creating at least one point of stable equilibrium trapping said at least one particle by generating said succession over time of a plurality of different field of force configurations where each taken individually is not necessarily suitable for creating said point of stable equilibrium, but the resulting effect of which is the creation of at least one said point of stable equilibrium suitable for trapping at least one said particle, wherein generating the succession of the plurality of different field of force configurations comprises generating a succession over time of different configurations of electric potentials applied to a first electrode of an array of electrodes and to second electrodes of said array adjacent to the first, said succession being chosen so as to form substantially a said point of stable equilibrium at said first electrode as a resulting effect and, simultaneously, prevent the same phase from being applied to adjacent electrodes of said electrode array in each field of force configuration of said succession over time of configurations with the consequent possible creation of undesired points of stable equilibrium.

2. The method as claimed in claim 1 wherein said field of force is a spatially non-uniform continuous or discontinuous electric field.

3. The method as claimed in claim 1, wherein the creating the at least one point of stable equilibrium comprises applying around said at least one particle an electric field variable with time by an array of first and second electrodes which can be individually addressed and operated and by at least one third electrode positioned facing towards and spaced apart from the first and second electrodes so as to delimit between itself and said array of first and second electrodes a confining chamber for said particles.

4. The method as claimed in claim 3, wherein the creating the at least one point of stable equilibrium comprises applying to at least one said first electrode a voltage configuration in phase with a voltage configuration applied to said at least one third electrode, and a succession over time of different voltage configurations to one group of second electrodes of said array immediately surrounding said point of stable equilibrium such that in each configuration of said plurality of field of force configurations at least one of the second electrodes of said group is in counter-phase with the voltage configuration applied to the third electrode.

5. The method as claimed in claim 4, wherein said succession over time of different voltage configurations is such that, in said pre-set time interval, all the second electrodes of said group surrounding a point of stable equilibrium to be generated take on, selectively or in groups, a voltage configuration in counter-phase with said third electrode.

6. The method as claimed in claim 4, wherein at least one of said voltage configurations of said time succession of configurations consists of voltages the frequency of which is different from that of the other voltage configurations.

7. The method as claimed in claim 3, wherein the creating the at least one point of stable equilibrium comprises creating the at least one point of stable equilibrium in a point not corresponding to a relative minimum of said electric field of each configuration of said plurality of different field of force configurations.

8. The method as claimed in claim 1, further comprising a step of moving said point of stable equilibrium along a controlled path.

9. The method as claimed in claim 8, wherein the moving said point of stable equilibrium along a controlled path comprises selectively varying the configuration of electric potentials applied to said first and second electrodes so as to generate, in sequence, a succession of points of stable equilibrium along said controlled path.

10. The method as claimed in claim 1, wherein said field of force is a dielectrophoretic field.

11. A method for the manipulation of particles comprising generating a succession of a plurality of different field of force configurations over a time interval, wherein effects of the plurality of different field of force configurations overlap to result effectively in a single field of force acting on the at least one particle, wherein a resulting effect of the field of force on said at least one particle is different from the effect of each configuration of said plurality of different field of force configurations taken individually, the resulting effect of the field of force trapping the at least one particle at approximately the same point during the time interval, wherein said particles are suspended in a fluid, wherein the generating the succession of the plurality of different field of force configurations comprises applying the plurality of different field of force configurations in a pre-set time interval (T) which is chosen so as to be lower than the cut-off frequency of the transfer function of a dynamic system consisting of said at least one particle and said fluid in which it is suspended.

12. A method for the manipulation of particles comprising a step of generating at least one configuration of field of force acting on at least one particle suspended in a fluid, the method comprising a step of generating a succession over time of a plurality of different field of force configurations, wherein, in combination:

i) said succession over time of a plurality of different field of force configurations creates a field of force by overlapping of the effects of said plurality of different field of force configurations, wherein the resulting effect of the field of force on said at least one particle is different from the effect of each configuration of said plurality of field of force configurations each taken individually; and ii) said time succession of different field of force configurations is applied in a pre-set time interval, which is chosen so as to be lower than the cut-off frequency of the transfer function of a dynamic system consisting of said at least one particle and said fluid in which it is suspended.

* * * * *

UNITED STATES PATENT AND TRADEMARK OFFICE

CERTIFICATE OF CORRECTION

PATENT NO. : 8,268,151 B2
APPLICATION NO. : 12/376761
DATED : September 18, 2012
INVENTOR(S) : Medoro et al.

It is certified that error appears in the above-identified patent and that said Letters Patent is hereby corrected as shown below:

Title page, item (75) Inventors

~~Giovanni Medoro Casalecchio di Reno, IT~~ should be Gianni Medoro, Casalecchio di Reno, IT.

Title page, item (22) PCT Filed

~~Aug. 7, 2007~~ should be Aug. 6, 2007.

Signed and Sealed this
Nineteenth Day of February, 2013

Teresa Stanek Rea
*Acting Director of the United States Patent and Trademark Office*